(12) United States Patent
Ouliankine et al.

(10) Patent No.: US 8,959,425 B2
(45) Date of Patent: Feb. 17, 2015

(54) INFERENCE-BASED EXTENSION ACTIVATION

(75) Inventors: Oleg Ouliankine, Redmond, WA (US); Jason Todd Henderson, Tacoma, WA (US); David Claux, Redmond, WA (US); Andrew Salamatov, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/315,314

(22) Filed: Dec. 9, 2011

(65) Prior Publication Data

US 2013/0151942 A1 Jun. 13, 2013

(51) Int. Cl.
*G06F 17/22* (2006.01)
*G06F 9/44* (2006.01)

(52) U.S. Cl.
USPC ........... 715/234; 715/749; 715/762; 719/328; 719/331

(58) Field of Classification Search
USPC ......... 715/200, 210, 234, 250, 255, 256, 273, 715/277, 700, 738, 749, 762, 763, 862; 719/328, 331, FOR. 170
See application file for complete search history.

(56) References Cited

U.S. PATENT DOCUMENTS

| | | | |
|---|---|---|---|
| 5,349,658 A | 9/1994 | O'Rourke et al. | |
| 5,877,757 A | 3/1999 | Baldwin et al. | |
| 5,986,657 A | 11/1999 | Berteig et al. | |
| 6,292,889 B1 | 9/2001 | Fitzgerald et al. | |
| 6,408,336 B1 | 6/2002 | Schneider et al. | |
| 6,449,643 B1 | 9/2002 | Hyndman et al. | |
| 6,530,075 B1 | 3/2003 | Beadle et al. | |
| 6,697,942 B1 | 2/2004 | L'Heureux et al. | |
| 6,754,896 B2 | 6/2004 | Mishra et al. | |
| 6,785,867 B2 | 8/2004 | Shaffer et al. | |
| 7,000,230 B1 * | 2/2006 | Murray et al. | 717/172 |
| 7,136,843 B2 | 11/2006 | Bigus et al. | |
| 7,219,234 B1 | 5/2007 | Ashland et al. | |
| 7,233,792 B2 * | 6/2007 | Chang | 455/422.1 |
| 7,243,336 B2 | 7/2007 | Brockway et al. | |
| 7,284,191 B2 | 10/2007 | Grefenstette et al. | |
| 7,333,956 B2 | 2/2008 | Malcolm | |
| 7,360,167 B2 | 4/2008 | Hennum et al. | |
| 7,506,263 B1 | 3/2009 | Johnston et al. | |
| 7,529,804 B1 | 5/2009 | Lu et al. | |
| 7,707,257 B2 | 4/2010 | Taieb et al. | |
| 7,765,212 B2 | 7/2010 | Surendran et al. | |
| 7,779,027 B2 * | 8/2010 | James et al. | 707/769 |
| 7,861,167 B2 * | 12/2010 | Fernando et al. | 715/700 |
| 7,912,822 B2 | 3/2011 | Bethlehem et al. | |
| 8,010,613 B2 * | 8/2011 | Oral et al. | 709/206 |
| 8,024,412 B2 * | 9/2011 | McCann et al. | 709/206 |
| 8,074,217 B2 * | 12/2011 | James et al. | 717/175 |

(Continued)

OTHER PUBLICATIONS

Majid, et al., "NaCIN—An Eclipse Plug-In for Program Navigation-based Concern Inference", In Proceedings of the OOPSLA Workshop on Eclipse Technology eXchange, Oct. 16, 2005, pp. 70-74.

(Continued)

*Primary Examiner* — Maikhanh Nguyen
(74) *Attorney, Agent, or Firm* — Louise Bowman; Jim Ross; Micky Minhas

(57) ABSTRACT

Extension activation may be provided. A document may be opened within a software application associated with an extension. Upon determining that a data element associated with the document is associated with an activation condition of the extension, the extension may be activated.

7 Claims, 3 Drawing Sheets

(56) References Cited

U.S. PATENT DOCUMENTS

| | | | |
|---|---|---|---|
| 8,220,007 B1* | 7/2012 | Yeh et al. ..................... 719/331 |
| 8,250,518 B2 | 8/2012 | Averett et al. |
| 8,255,280 B1 | 8/2012 | Kay et al. |
| 8,275,356 B2 | 9/2012 | Hickie |
| 8,429,286 B2 | 4/2013 | Pantos |
| 8,826,455 B2 | 9/2014 | Julisch |
| 8,843,822 B2 | 9/2014 | Claux et al. |
| 2002/0059347 A1 | 5/2002 | Shaffer et al. |
| 2002/0103824 A1* | 8/2002 | Koppolu et al. ........... 707/501.1 |
| 2002/0171671 A1 | 11/2002 | Bou et al. |
| 2003/0126592 A1 | 7/2003 | Mishra et al. |
| 2003/0196172 A1 | 10/2003 | Bates et al. |
| 2004/0034860 A1* | 2/2004 | Fernando et al. ............ 719/315 |
| 2004/0059813 A1 | 3/2004 | Bolder et al. |
| 2004/0117799 A1 | 6/2004 | Brockway et al. |
| 2004/0119745 A1 | 6/2004 | Bartek et al. |
| 2005/0033728 A1 | 2/2005 | James et al. |
| 2005/0091184 A1* | 4/2005 | Seshadri et al. .................. 707/1 |
| 2005/0144318 A1* | 6/2005 | Chang .......................... 709/245 |
| 2005/0188174 A1 | 8/2005 | Guzak et al. |
| 2005/0229104 A1 | 10/2005 | Franco et al. |
| 2005/0289113 A1 | 12/2005 | Bookstaff |
| 2005/0289535 A1* | 12/2005 | Murray et al. ................ 717/172 |
| 2006/0004739 A1* | 1/2006 | Anthony et al. ................ 707/4 |
| 2006/0036725 A1 | 2/2006 | Chand |
| 2006/0036965 A1 | 2/2006 | Harris et al. |
| 2006/0069836 A1 | 3/2006 | Seo et al. |
| 2006/0101053 A1* | 5/2006 | Proctor ........................ 707/102 |
| 2006/0155812 A1 | 7/2006 | Looman |
| 2006/0168136 A1* | 7/2006 | Bethlehem et al. ........... 709/219 |
| 2006/0173859 A1 | 8/2006 | Kim et al. |
| 2006/0195575 A1 | 8/2006 | Delany et al. |
| 2006/0218488 A1 | 9/2006 | Shah et al. |
| 2007/0061401 A1 | 3/2007 | Bodin et al. |
| 2007/0094408 A1 | 4/2007 | Gundla et al. |
| 2007/0136603 A1 | 6/2007 | Kuecuekyan |
| 2007/0156897 A1 | 7/2007 | Lim |
| 2007/0156913 A1* | 7/2007 | Miyamoto et al. ........... 709/230 |
| 2007/0226204 A1 | 9/2007 | Feldman |
| 2007/0233791 A1 | 10/2007 | Sylthe et al. |
| 2007/0240098 A1* | 10/2007 | Averett et al. ................ 717/104 |
| 2007/0244987 A1 | 10/2007 | Pedersen et al. |
| 2007/0261066 A1 | 11/2007 | Miyamoto et al. |
| 2008/0109448 A1 | 5/2008 | Aboel-Nil et al. |
| 2008/0134162 A1* | 6/2008 | James et al. .................. 717/168 |
| 2008/0155555 A1 | 6/2008 | Kwong |
| 2008/0189360 A1 | 8/2008 | Kiley et al. |
| 2008/0244440 A1 | 10/2008 | Bailey et al. |
| 2008/0244443 A1 | 10/2008 | Schaw et al. |
| 2008/0294730 A1 | 11/2008 | Oral et al. |
| 2008/0307046 A1 | 12/2008 | Baek et al. |
| 2009/0006201 A1 | 1/2009 | Faseler, Jr. |
| 2009/0044146 A1* | 2/2009 | Patel et al. .................... 715/808 |
| 2009/0094332 A1 | 4/2009 | Schemers et al. |
| 2009/0150981 A1 | 6/2009 | Amies et al. |
| 2009/0164427 A1 | 6/2009 | Shields et al. |
| 2009/0193444 A1 | 7/2009 | Clark et al. |
| 2009/0210800 A1 | 8/2009 | McCann et al. |
| 2009/0265139 A1 | 10/2009 | Klein et al. |
| 2009/0265330 A1 | 10/2009 | Cheng et al. |
| 2009/0300597 A1* | 12/2009 | George et al. ................ 717/173 |
| 2009/0307652 A1* | 12/2009 | Maybee et al. ............... 717/104 |
| 2009/0313554 A1 | 12/2009 | Haynes et al. |
| 2009/0319911 A1 | 12/2009 | McCann et al. |
| 2009/0327352 A1 | 12/2009 | Thomas et al. |
| 2010/0011352 A1 | 1/2010 | Chu et al. |
| 2010/0153915 A1 | 6/2010 | Schneider |
| 2010/0262557 A1 | 10/2010 | Ferreira et al. |
| 2010/0287525 A1 | 11/2010 | Wagner |
| 2011/0029988 A1 | 2/2011 | Mittal et al. |
| 2011/0072352 A1 | 3/2011 | Tanner et al. |
| 2011/0087984 A1 | 4/2011 | Jitkoff et al. |
| 2011/0093801 A1 | 4/2011 | Koyama et al. |
| 2011/0113450 A1 | 5/2011 | Sharma et al. |
| 2011/0145749 A1 | 6/2011 | Sailor et al. |
| 2011/0154312 A1 | 6/2011 | Balko et al. |
| 2011/0209159 A1 | 8/2011 | Baratz et al. |
| 2011/0289056 A1 | 11/2011 | Xue et al. |
| 2012/0005155 A1 | 1/2012 | Lynch et al. |
| 2012/0023421 A1 | 1/2012 | Demant et al. |
| 2012/0084644 A1 | 4/2012 | Robert et al. |
| 2012/0094719 A1 | 4/2012 | Choi et al. |
| 2012/0144282 A1 | 6/2012 | Loeb et al. |
| 2013/0076598 A1 | 3/2013 | Sirpal et al. |
| 2013/0185362 A1 | 7/2013 | Clagg et al. |
| 2013/0198623 A1 | 8/2013 | Claux et al. |
| 2013/0198627 A1 | 8/2013 | Claux et al. |
| 2013/0198647 A1 | 8/2013 | Claux et al. |

OTHER PUBLICATIONS

"Spam Filter", Retrieved on: Sep. 26, 2011, Available at: http://www.esoft.com/network-security-appliances/add-ons/spamfilter/.

U.S. Appl. No. 13/361,097, filed Jan. 30, 2012, entitled "Extension Activation for Related Documents".

U.S. Appl. No. 13/361,140, filed Jan. 30, 2012, entitled "Dynamic Extension View With Multiple Levels of Expansion".

U.S. Appl. No. 13/361,219, filed Jan. 30, 2012, entitled "Intelligent Prioritization of Activated Extensions".

U.S. Appl. No. 13/351,310, filed Jan. 17, 2012, entitled "Installation and Management of client Extensions".

"Changes in Outlook 2010", Retrieved on: Oct. 10, 2011, Available at: http://technet.microsoft.com/en-us/library/cc179110.aspx.

"Extension Plug-ins for Processing Messages", Retrieved on: Oct. 10, 2011, Available at: http://docs.blackberry.com/en/admin/deliverables/25767/Ext_plugins_for_processing_msgs_595319_11.jsp.

"Glovia G2 Web Client—Full Windows Graphical user Interface Client within any Browser Supporting ActiveX" Retrieved on: Oct. 10, 2011, Available at: http://www.glovia.com/pdf/datasheets/GloviaWebClient.pdf.

"Gmail Contextual Gadgets Developer's Guide", Retrieved on: Oct. 17, 2011, Available at: http://code.google.com/apis/gmail/gadgets/contextual/.

"Installing Content Collector Notes Client Extension in Silent Mode", Retrieved on: Oct. 10, 2011, Available at: http://publib.boulder.ibm.com/infocenter/email/v2r2m0/index.jsp?topic=%2Fcom.ibm.content.collector.doc%2Finstalling%2Ft_afu_install_nce_silent.htm.

"Manage Windows and Panels", Retrieved on: Oct. 10, 2011, Available at: http://help.adobe.com/en_US/InDesign/6.0/WS8599BC5C-3E44-406c-9288-C3B3BBEB5E88.html.

"RSEMCE_235677.EXE—Remote Storage for Exchange v2.0 Mail Client Extension Install", Retrieved on: Oct. 10, 2011, Available at: http://www.symantec.com/business/support/index?page=content&pmv=print&impressions=&viewlocale=&id=TECH10485.

"Thunderbird Email Thread Visualizer", Published on: Oct. 11, 2011, Available at: http://www.ghacks.net/2009/08/13/thunderbird-email-thread-visualizer/.

"Window Layout—Thunderbird", Retrieved on: Oct. 7, 2011, Available at: http://kb.mozillazine.org/Window_layout_-_Thunderbird.

Aery, et al., "eMailSift: Email Classification Based on Structure and Content", In Proceedings of the Fifth IEEE International Conference on Data Mining, Nov. 27-30, 2005, pp. 18-25.

Bekkerman, et al., "Automatic Categorization of Email into Folders: Benchmark Experiments on Enron and SRI Corpora", In CIIR Technical Report IR-418, University of Massachusetts, 2004, pp. 1-23.

Bykov, Vassili, "Hopscotch: Towards User Interface Composition", In Proceedings of International Workshop on Advanced Software Development Tools and Techniques, Jul. 2008, 9 pages.

Dejean, et al., "What's new in IBM Lotus Notes and Domino V8", Published on: Mar. 20, 2007, Available at: http://www.ibm.com/developerworks/lotus/library/notes8-new/.

International Search Report and Written Opinion for PCT/US2012/066691 mailed Feb. 28, 2013.

Nedos, et al., "LATTE: Location and Time Triggered Email", In Proceedings of the International Conference on Pervasive Computing and Communications, Jun. 21-24, 2004, pp. 813-819.

(56) References Cited

OTHER PUBLICATIONS

Rohall, et al., "Email Visualizations to Aid Communications", In Proceedings of Late-Breaking Hot Topics, IEEE Symposium on Information Visualization, Oct. 2011, pp. 12-15.
International Search Report and Written Opinion for PCT/US2013/020915 mailed Apr. 23, 2013, 10 pgs.
International Search Report and Written Opinion for PCT/US2013/022823 mailed May 10, 2013, 10 pgs.
International Search Report and Written Opinion for PCT/US2013/022826 mailed May 10, 2013, 11 pgs.
International Search Report and Written Opinion for PCT/US2013/022615 mailed May 16, 2013, 9 pgs.
U.S. Office Action dated Jul. 16, 2013 cited in U.S. Appl. No. 13/361,140, 22 pgs.
U.S. Office Action dated Sep. 10, 2013 cited in U.S. Appl. No. 13/361,219, 33 pgs.
U.S. Office Action dated Aug. 13, 2013 cited in U.S. Appl. No. 13/351,310, 36 pgs.
Rex Thexton et al., "A Role-Based Approach to Automated Provisioning and Personalized Portals," Jan. 2011, 7 pgs., http://www.oracle.com/technetwork/articles/role-based-automated-provisioning-213244.html.
U.S. Office Action dated Jan. 14, 2014 cited in U.S. Appl. No. 13/361,097, 18 pgs.
U.S. Final Office Action dated Feb. 19, 2014 cited in U.S. Appl. No. 13/361,140, 32 pgs.
U.S. Final Office Action dated Mar. 3, 2014 cited in U.S. Appl. No. 13/361,219, 22 pgs.
U.S. Final Office Action dated Jun. 4, 2014 cited in U.S. Appl. No. 13/361,097, 27 pgs.
U.S. Office Action dated Oct. 6, 2014 cited in U.S. Appl. No. 13/361,140, 35 pgs.
U.S. Office Action dated Dec. 18, 2014 cited in U.S. Appl. No. 13/351,310, 59 pgs.
U.S. Office Action dated Dec. 22, 2014 cited in U.S. Appl. No. 13/361,097, 31 pgs.

\* cited by examiner

INFERENCE-BASED EXTENSION ACTIVATION

BACKGROUND

Inference-based extension activation may be provided. Extensions, add-ins and/or plug-ins activate during reading, editing or composing of documents such as e-mails, calendar items, contacts, tasks, documents, spreadsheets, etc. In conventional systems, the activation may occur on demand or automatically based on the content of the document in question. In some situations, the basic conditional activation using content substring matching or pattern-based content matching is insufficient for activation based on heuristic matching of document content and/or data from external sources.

SUMMARY

This Summary is provided to introduce a selection of concepts in a simplified form that are further described below in the Detailed Description. This Summary is not intended to identify key features or essential features of the claimed subject matter. Neither is this Summary intended to be used to limit the claimed subject matter's scope.

Extension activation may be provided. A document may be opened within a software application associated with an extension. Upon determining that a data element associated with the document is associated with an activation condition of the extension, the extension may be activated.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
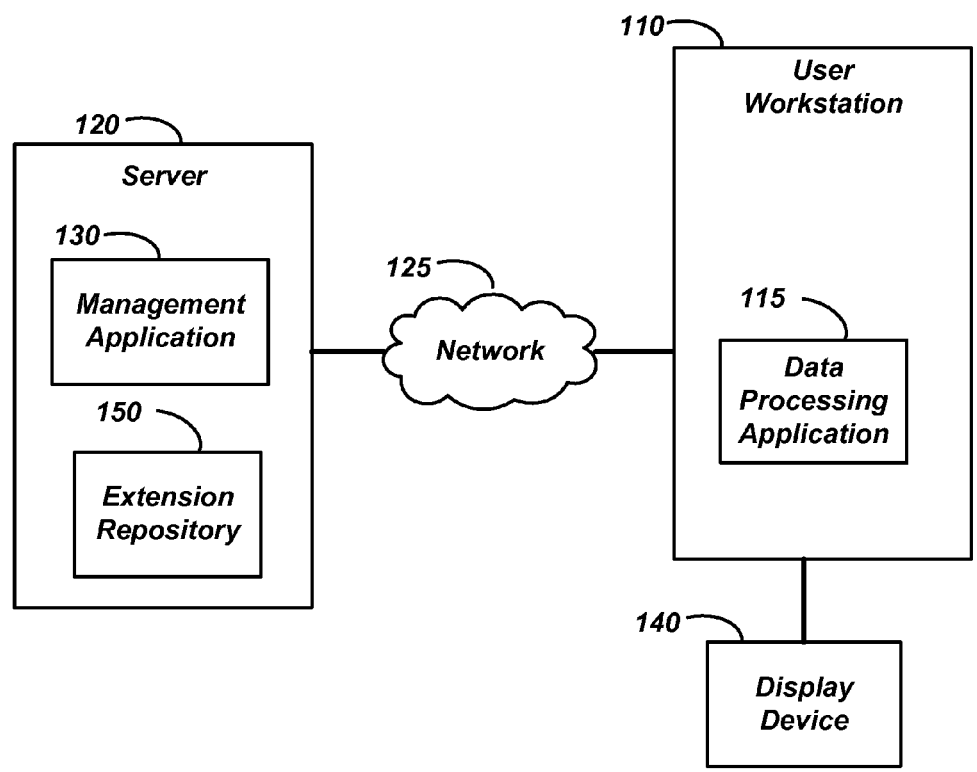
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Inference-based extension activation may provide conditional activation of add-in application modules (e.g., plug-ins) that may be based on information inferred from the content of data within and/or external to the application. Such external data may comprise, for example, an external database, a web service, and/or another application. These extensions may expose additional functionality that the native application does not provide. Rather than being constantly available, however, as a menu bar might be, the extension may be visible to the user only when it is relevant to data that is displayed to the user. For example, a window displaying a map may appear when an e-mail message comprising a postal address is displayed.

The inference may utilize complex heuristic analysis of the content for extension activation. The external data sources may be used to provide additional extension activation criteria and/or inference data. For activation on heuristic analysis, a pre-processing component may perform content analysis out-of-band and save the result of the analysis as a meta-data and/or a property on the document. Later views of the document may use that analysis result to conditionally activate extensions. For example, a physical address in a user language may be detected, extracted and saved as a meta-data that way and later used to activate an extension that shows the location of that address using an internet mapping service.

FIG. 1 is a block diagram of an operating environment 100 for providing extension activation comprising a user workstation 110. User workstation 110 may comprise a data processing application 115 and may be operative to interact with a server 120 via a network 125. Data processing application 115 may comprise, for example, a word processing, spreadsheet, presentation and/or other productivity application. For example, user workstation 110 may be operative to connect to a multi-user collaboration application 130 provided by a server 120 that may receive and process user requests from user workstation 110. User workstation 110 may be operative to output application data and/or user interfaces to a display device 140, such as a monitor and/or touchscreen. User workstation 110 may comprise, for example, an electronic communications device such as a computer, laptop, cellular and/or IP phone, tablet, game console and/or other device. Data processing application 115 may be operative to utilize a local extension library 145 and/or a remote extension library 150.

Figure 2:
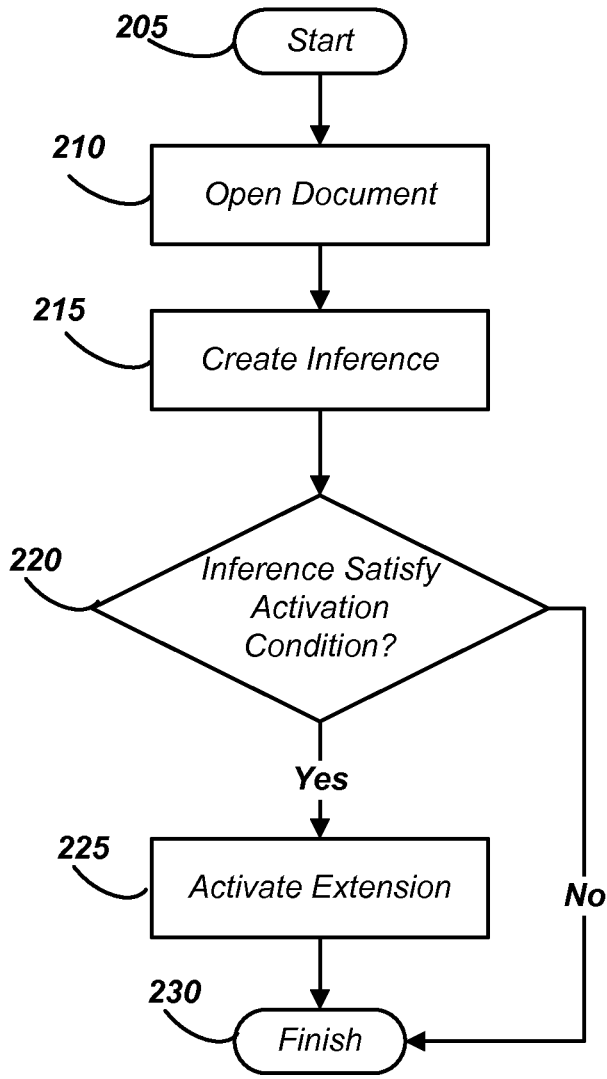
FIG. 2 is a flow chart of a method for providing extension activation.

FIG. 2 is a flow chart setting forth the general stages involved in a method 200 consistent with an embodiment of the invention for providing extension activation. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may open a document within a software application. For example, user workstation 115 may instantiate data processing application 115. Data processing application 110 may be operative to access local extension library 145 and/or remote extension library 150 in order to provide additional functionality to the user of user workstation 110.

Method 200 may then advance to stage 220 where computing device 300 may create an inference according to at least one data element associated with the document. For example, the data element may be internal to the document, such as text, formatting, and/or meta-data. For another example, the data element may be external to the document, such as user permissions, group management and/or other information technology data, database entries, web pages, organization charts, and/or user profile data (e.g., geographic location, preferences, settings, job title, etc.).

The inference may comprise an intent assigned to the document, a heuristically learned association between the at least one data element and a task, a regular expression match on the at least one data element, and/or a format of the document. For intents, the document's text may be scanned to determine goals and/or tasks associated with the document, such as where an e-mail comprising a subject line and/or an attached document entitled "proposed agenda" may be associated with an intent of scheduling a meeting. A heuristically learned association may comprise, for example, receiving e-mails with particular terms (e.g., "service shutdown" and/or "error") and/or from particular senders (e.g., a tech support mailing list) and correlating those e-mails with launching a trouble ticket management extension. Once this behavior has been seen some threshold of times, an inference may be created when the trigger condition terms and/or senders are received that the trouble ticket extension is associated with those trigger condition. Document formatting inferences may comprise, for example, recognizing an address block of a letter document and/or a signature block of an e-mail and associating those data elements with a contact management extension.

From stage 215, method 200 may advance to stage 220 where computing device 300 may determine whether the inference satisfies an activation condition of at least one of the plurality of extensions. For example, the inference may need to satisfy a criteria of the extension (e.g., the extension is only associated with e-mail document types) and a trigger condition (e.g., the e-mail message comprises a stock trade confirmation.)

If the inference is determined to satisfy the activation condition of at least one of the plurality of extensions, method 200 may advance to stage 225 where computing device 300 may activate the at least one of the plurality of extensions. For example, when an e-mail message comprising a stock trade confirmation is received, an inference that the e-mail is associated with a stock portfolio management extension may be created and the stock portfolio management extension may be launched, displaying a user interface element. For another example, a document comprising a package tracking number may cause an extension associated with the package carrier to display the package's current status. Method 200 may then end at stage 230.

An embodiment consistent with the invention may comprise a system for providing extension activation. The system may comprise a memory storage and a processing unit coupled to the memory storage. The processing unit may be operative to open a document within a software application associated with at least one extension, determine whether a data element associated with the document is associated with an activation condition of the at least one extension and, in response to determining that the document is associated with the activation condition of the at least one extension, activating the at least one extension. The data element may be stored in the document (e.g., text within the document and/or document formatting) and/or external to the document or application (e.g., a database, user/group management data, an org chart, user profile data).

Another embodiment consistent with the invention may comprise a system for providing extension activation. The system may comprise a memory storage and a processing unit coupled to the memory storage. The processing unit may be operative to instantiate a software application, wherein the software application is associated with a plurality of extensions, open a document comprising a plurality of data elements within the software application, determine whether at least one of the plurality of data elements is associated with an activation condition of at least one of the plurality of extensions, and in response to determining that the at least one of the plurality of data elements is associated with the activation condition of the at least one extension, activate the at least one extension, wherein the at least one extension provides a user interface element associated with the software application.

The processing unit may be further operative to associate a new extension with the software application. For example, a user may develop a new extension and associate it with a software application developed by another company.

Yet another embodiment consistent with the invention may comprise a system for providing extension activation. The system may comprise a memory storage and a processing unit coupled to the memory storage. The processing unit may be operative to open a document within a software application associated with a plurality of extensions operative to provide additional functionality to the software application, create an inference according to at least one data element associated with the document, and determine whether the inference satisfies an activation condition of at least one of the plurality of extensions. Being operative to determine whether the inference satisfies the activation condition may comprise the processing unit being operative to match a criteria of the at least one extension and satisfying a trigger condition of the at least one extension. In response to determining that the inference satisfies the activation condition of at least one of the plurality of extensions, the processing unit may be operative to activate the at least one of the plurality of extensions, wherein being operative to activate the at least one of the plurality of extensions may comprise being operative to display a user interface element associated with the software application operative to provide at least one new data element.

Figure 3:
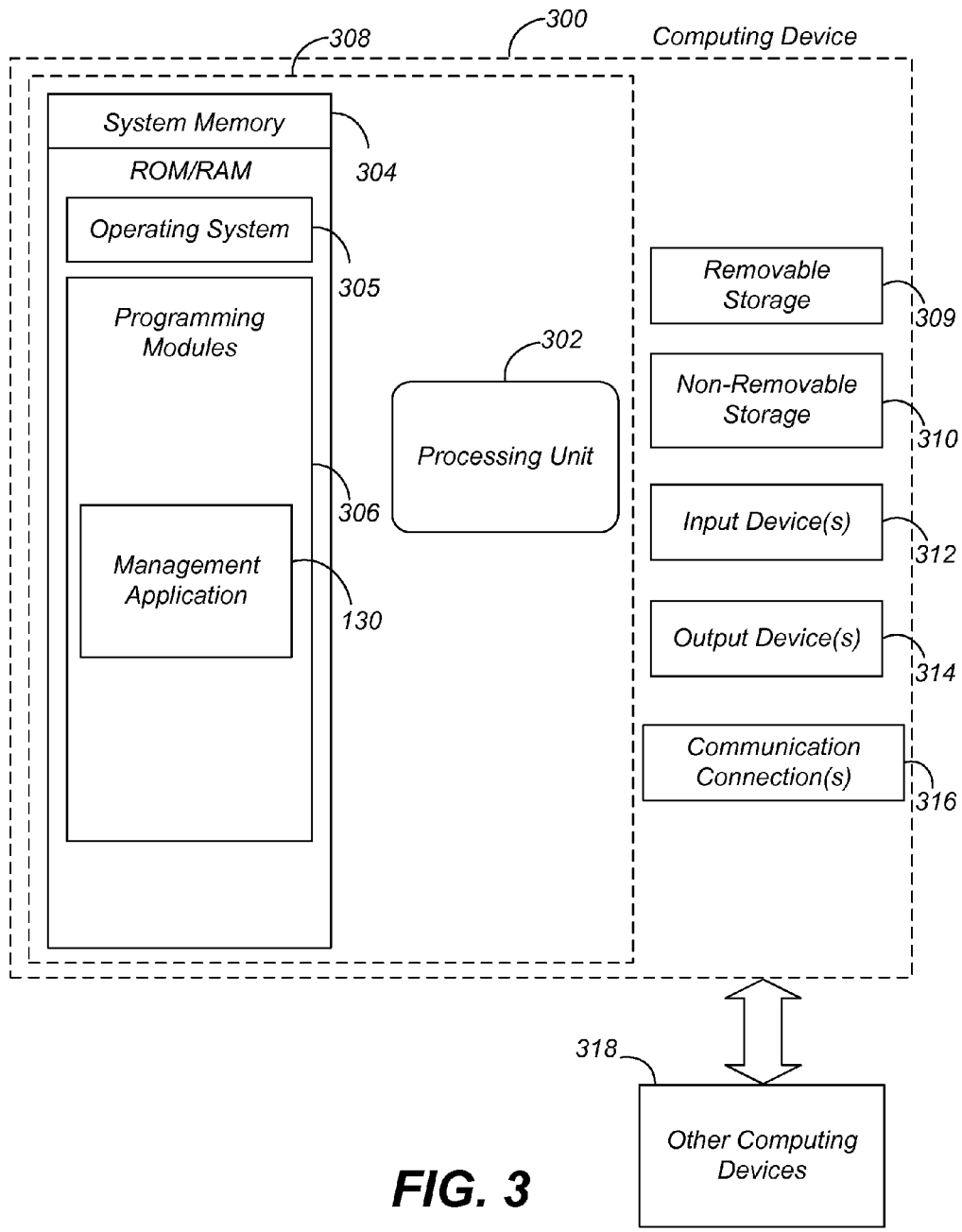
FIG. 3 is a block diagram of a computing device.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIG. 3 and the associated descriptions provide a discussion of a variety of operating environments in which embodiments of the invention may be practiced. However, the devices and systems illustrated and discussed with respect to FIG. 3 are for purposes of example and illustration and are not limiting of a vast number of computing device configurations that may be utilized for practicing embodiments of the invention, described herein.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include data processing application 115. Operating system 305, for example, may be suitable for controlling computing device 300's operation. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow device 300 to communicate with other computing devices 318, such as over a network in a distributed computing environment, for example, an intranet or the Internet. Communication connection 316 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, a capture device, etc. A capture device may be operative to record a user and capture spoken words, motions and/or gestures made by the user, such as with a camera and/or microphone. The capture device may comprise any speech and/or motion detection device capable of detecting the speech and/or actions of the user. For example, the capture device may comprise a Microsoft® Kinect® motion capture device comprising a plurality of cameras and a plurality of microphones. Output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 304, including operating system 305. While executing on processing unit 302, programming modules 306 may perform processes and/or methods as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each and/or many of the components illustrated above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any component of operating environment 100 may operate via application-specific logic integrated with other components of the computing device/system on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A computer readable hardware storage device which stores a set of instructions which when executed performs a method for providing extension activation, the method executed by the set of instructions comprising:
   opening a document within a software application, wherein the software application is associated with a plurality of extensions operative to provide additional functionality to the software application;
   creating an inference according to at least one data element associated with the document, wherein the at least one data element comprises at least one of the following: a data element internal to the document and a data element external to the document and wherein the inference comprises at least one of the following: an intent assigned to the document, a regular heuristically learned association between the at least one data element and a task, an expression match on the at least one data element, and a format of the document;
   determining whether the inference satisfies an activation condition of at least one of the plurality of extensions, wherein determining whether the inference satisfies the activation condition comprises matching a criteria of the at least one extension and satisfying a trigger condition of the at least one extension; and
   in response to determining that the inference satisfies the activation condition of at least one of the plurality of extensions, activating the at least one of the plurality of extensions, wherein activating the at least one of the plurality of extensions comprises displaying a user interface element associated with the software application operative to provide at least one new data element.

2. A method for providing extension activation, the method comprising:
   opening a document within a software application, wherein the software application is associated with a plurality of extensions operative to provide additional functionality to the software application;
   creating an inference according to at least one data element associated with the document wherein the inference comprises at least one of the following: an intent assigned to the document, a regular heuristically learned association between the at least one data element and a task, an expression match on the at least one data element, and a format of the document;
   determining whether the inference satisfies an activation condition of at least one of the plurality of extensions, wherein determining whether the inference satisfies the activation condition comprises matching a criteria of the at least one extension and satisfying a trigger condition of the at least one extension; and
   in response to determining that the inference satisfies the activation condition of the at least one of the plurality of extensions, activating, by a computing device, the at least one of the plurality of extensions, wherein activating the at least one of the plurality of extensions comprises displaying a user interface element associated with the software application operative to provide at least one new data element.

3. The method of claim 2, wherein creating the inference according to the at least one data element comprises creating the inference according to the at least one data element wherein the at least one data element comprises a data element internal to the document.

4. The method of claim 2, wherein creating the inference according to the at least one data element comprises creating the inference according to the at least one data element wherein the at least one data element comprises a data element external to the document.

5. A system for providing extension activation, the system comprising:
   a memory storage; and
   a processing unit coupled to the memory storage, wherein the processing unit is operable to:

open a document within a software application, wherein the software application is associated with a plurality of extensions operative to provide additional functionality to the software application, create an inference according to at least one data element associated with the document, wherein the inference comprises at least one of the following: an intent assigned to the document, a regular heuristically learned association between the at least one data element and a task, an expression match on the at least one data element, and a format of the document, determine whether the inference satisfies an activation condition of at least one of the plurality of extensions wherein the processing unit being operable to determine whether the inference satisfies the activation condition comprises the processing unit being operable to match a criteria of the at least one extension and satisfying a trigger condition of the at least one extension, and activate the at least one of the plurality of extensions in response to determining that the inference satisfies the activation condition of the at least one of the plurality of extensions wherein the processing unit being operable to activate the at least one of the plurality of extensions comprises the processing unit being operable to display a user interface element associated with the software application operative to provide at least one new data element.

6. The system of claim 5, wherein the at least one data element comprises a data element internal to the document.

7. The system of claim 5, wherein the at least one data element comprises a data element external to the document.

* * * * *